United States Patent
Eisen et al.

[11] Patent Number: 6,071,978
[45] Date of Patent: Jun. 6, 2000

[54] METHOD OF PRODUCING HYDROCARBON-EXPANDED RIGID POLYURETHANE FOAMS

[75] Inventors: Norbert Eisen; Torsten Heinemann, both of Köln, Germany; Dennis McCullough, Lake Orion, Mich.; Walter Klän, Leverkusen, Germany

[73] Assignee: Bayer Aktiengesellschaft, Leverkusen, Germany

[21] Appl. No.: 09/142,992

[22] PCT Filed: Mar. 3, 1997

[86] PCT No.: PCT/EP97/01060

§ 371 Date: Sep. 11, 1998

§ 102(e) Date: Sep. 11, 1998

[87] PCT Pub. No.: WO97/34946

PCT Pub. Date: Sep. 25, 1997

[30] Foreign Application Priority Data

Mar. 15, 1996 [DE] Germany ............................ 196 10 262

[51] Int. Cl.[7] ...................................................... C08J 9/04
[52] U.S. Cl. ......................... 521/131; 521/170; 521/172; 521/173; 521/174
[58] Field of Search ..................... 521/131, 170, 521/172, 173, 174

[56] References Cited

U.S. PATENT DOCUMENTS

| | | | |
|---|---|---|---|
| 3,178,490 | 4/1965 | Petrino et al. | 264/41 |
| 3,182,104 | 5/1965 | Cwik | 264/45 |
| 4,757,097 | 7/1988 | Dietrich et al. | 521/167 |
| 5,418,262 | 5/1995 | Gobel | 523/116 |
| 5,451,615 | 9/1995 | Birch | 521/132 |
| 5,464,562 | 11/1995 | Patterson | 252/182.28 |
| 5,484,817 | 1/1996 | Patterson | 521/116 |
| 5,488,071 | 1/1996 | Patterson | 521/114 |
| 5,514,724 | 5/1996 | Green et al. | 521/78 |
| 5,521,226 | 5/1996 | Bleys | 521/174 |
| 5,602,190 | 2/1997 | Lamberts et al. | 521/131 |
| 5,677,361 | 10/1997 | Treboux et al. | 521/137 |
| 5,688,835 | 11/1997 | Scherbel et al. | 521/131 |
| 5,762,822 | 6/1998 | Tucker | 252/182.2 |

*Primary Examiner*—John M. Cooney, Jr.
*Attorney, Agent, or Firm*—Joseph C. Gil; Lyndanne M. Whalen

[57] ABSTRACT

A process for preparing polyurethane rigid foams from polyols and polyisocyanates as well as blowing agents and optionally foam auxiliary agents, characterized in that the polyurethane rigid foam is obtained by reacting A) a polyol component with on average at least 3 hydrogen atoms, containing
  1. 60 to 100% of polyethers and/or polyesters with at least 2 hydroxyl groups and a molecular weight of 250 to 1,500, which have a surface tension of 6 to 14 mN/m with respect to i-pentane and/or n-pentane as blowing agent,
  2. i-pentane and/or n-pentane as blowing agent,
  3. water and
  4. optionally auxiliary agents and additives with B) a polyisocyanate with an NCO-content of 20 to 48 wt. % which has a surface tension of 4.0 to 8 mN/m with respect to i-pentane or n-pentane as blowing agent is described.

11 Claims, No Drawings

METHOD OF PRODUCING HYDROCARBON-EXPANDED RIGID POLYURETHANE FOAMS

BACKGROUND OF THE INVENTION

It is known that polyurethane rigid foams can be blown with low-boiling alkanes. Cyclic alkanes are used to advantage here because they make an outstanding contribution to the thermal conductivity of the expanded material due to their low gaseous thermal conductivity. Cyclopentane is preferably used.

The beneficial properties when used as an insulator in domestic refrigerators have to be compared with a disadvantageous commercial situation. Thus, a specific quality of polystyrene inner container has to be used, as a result of the solvent properties of cyclopentane.

Furthermore, cyclopentane has the disadvantage, due to its relatively high boiling point of 49° C., that it condenses at low temperatures such as are conventional during the use of polyurethane rigid foams as insulators in domestic refrigerators. Due to the undesired condensation of the blowing agent, a reduced pressure is produced in the cells which again has to be offset by an elevated foam strength or increased density.

Compared with the acyclic homologous pentane compounds, n-pentane and i-pentane, cyclopentane incurs higher manufacturing costs. n-pentane or i-pentane blown systems have been known for some time in the field of polyurethane rigid foams. However, the higher gaseous thermal conductivities, as compared with cyclopentane, which result in poorer thermal insulation capacity of the corresponding expanded systems is a disadvantage.

The object of the present invention was to develop a n-pentane or i-pentane blown rigid foam in which the disadvantages mentioned above are overcome and in particular in which low thermal conductivities are produced.

Surprisingly, it has now been found that polyol formulations based on specific polyethers and/or polyesters and polyisocyanates, which have a specific surface tension with respect to n-pentane or i-pentane as blowing agent, produce expanded materials with particularly low thermal conductivities.

SUMMARY OF THE INVENTION

The invention provides a process for preparing polyurethane rigid foams from polyols and polyisocyanates as well as blowing agents and optionally foam auxiliary agents, characterised in that the polyurethane rigid foam is obtained by reacting A) a polyol component with on average at least 3 hydrogen atoms, containing
  1. 60 to 100% of polyethers and/or polyesters with at least 2 hydroxyl groups and a molecular weight of 250 to 1,500, which have a surface tension of 6 to 14 mN/m with respect to i-pentane and/or n-pentane as blowing agent,
  2. i-pentane and/or n-pentane as blowing agent,
  3. water and
  4. optionally auxiliary agents and additives
with
B) a polyisocyanate with an NCO-content of 20 to 48 wt. % which has a surface tension of 4.0 to 8 mN/m with respect to i-pentane or n-pentane as blowing agent.

DETAILED DESCRIPTION OF THE INVENTION

Polyol formulations according to the invention preferably contain polyethers with a molecular weight of 250 to 1,500, obtained by the polyaddition of 70 to 100 wt. % of ethylene oxide and 0 to 30 wt. % of propylene oxide to starter compounds.

Preferred compounds are sorbitol started polyethers with a molecular weight of 500 to 1,400 based on 70 to 100 wt. % of ethylene oxide and 0 to 30 wt. % of 1,2-propylene oxide; sucrose started polyethers with a molecular weight of 500 to 1,400 based on 70 to 100 wt. % of ethylene oxide and 0 to 30 wt. % of 1,2-propylene oxide; trimethylolpropane started polyethers with a molecular weight of 250 to 850 based on 70 to 100 wt. % of ethylene oxide and 0 to 30 wt. % of 1,2-propylene oxide; glycerine started polyethers with a molecular weight of 250 to 850 based on 70 to 100 wt. % of ethylene oxide and 0 to 30 wt. % of 1,2-propylene oxide; o-toluylene-diamine started polyethers with a molecular weight of 250 to 850 based on 70 to 100 wt. % of ethylene oxide and 0 to 30 wt. % of 1,2-propylene oxide.

According to the invention the polyol formulations preferably contain polyesters with a molecular weight of 200 to 600 formed from aromatic and aliphatic dicarboxylic acids and polyols containing at least 2 hydroxyl groups. Examples of dicarboxylic acids are phthalic acid or phthalic anhydride, terephthalic acid, isophthalic aid, malonic acid and succinic acid. The following are preferably used as the alcohol component for esterification: ethylene glycol, di, tri or tetraethylene glycol or mixtures thereof.

Polyol formulations according to the invention may also contain polyether-esters, such as are obtainable by the reaction of phthalic anhydride with diethylene glycol and then with ethylene oxide (EP-A 0 250 967).

Polyethers and polyesters according to the invention preferably have a surface tension of 6 to 14 mN/m, in particular 10 to 13, with respect to n-pentane and/or i-pentane.

In polyol formulations, these products are preferably present in a proportion of 60 to 100%, preferably 80 to 90%.

Polyisocyanates are preferably prepolymers with terminal NCO groups.

The isocyanate components are, e.g. aromatic polyisocyanates such as are described, for instance, by W. Siefkin in Justus Liebigs Annalen der Chemie, 562, pages 75 to 136, for example those of the formula

in which
  n is 2 to 4, preferably 2 and
  Q represents an aliphatic hydrocarbon group with 2 to 18, preferably 6 to 10, carbon atoms, a cycloaliphatic hydrocarbon group with 4 to 15, preferably 5 to 10, carbon atoms, an aromatic hydrocarbon group with 8 to 15, preferably 8 to 13, carbon atoms, e.g. polyisocyanates like those which are described in DE-OS 2 832 253, pages 10 to 11.

Industrially readily accessible polyisocyanates are generally particularly preferred, e.g. 2,4 and 2,6-toluylene diisocyanate and any mixture of these isomers ("TDI), polyphenylpolymethylene polyisocyanates such as can be prepared by aniline/formaldehyde condensation and subsequent phosgenation (crude "MDI") and polyisocyanates with carbodiimide groups, urethane groups, allophanate groups, isocyanurate groups, urea groups or biuret groups ("modified polyisocyanates"), in particular modified polyisocyanates which are derived from 2,4 and 2,6-toluylene diisocyanate or from 4,4' and/or 2,4'-diphenylmethane diisocyanate.

Starting components for the prepolymers are organic compounds with at least one hydroxyl group.

Polyol or polyester components with a molecular weight of 60 to 1,400 and containing 1 to 4 hydroxyl groups are preferred.

Polyesters with a molecular weight of 200 to 600 based on aromatic and/or aliphatic dicarboxylic acids and polyethers with a molecular weight of 60 to 1,400, obtained by the polyaddition of 70 to 100 wt. % of ethylene oxide and 0 to 30 wt. % of 1,2-propylene oxide to starter compounds such as ethylene glycol, trimethylolpropane and glycerine are preferred.

Products produced from phthalic anhydride with diethylene glycol and/or ethylene glycol are particularly preferred.

Polyether-esters with a molecular weight of 300 to 450, such as are obtainable by the reaction of phthalic anhydride with diethylene glycol and subsequently with ethylene oxide are also particularly preferred (EP-A 0 250 967).

Prepolymers according to the invention preferably have a surface tension of 4.5 to 8 mN/m, in particular of 5 to 7 mN/m, with respect to n-pentane and/or i-pentane.

Paraffins or fatty alcohols or dimethylpolysiloxanes as well as pigments or colorants, also stabilisers against the effects of ageing and weathering, plasticisers and anti-fungal or anti-bacterial substances as well as fillers such as barium sulphate, kieselguhr, carbon black or prepared chalk, may also be incorporated.

Further examples of optionally incorporated surface active additives and foam stabilisers, as well as cell regulators, reaction retardants, stabilisers, flame inhibiting substances, colorants and fillers as well as anti-fungal and anti-bacterial substances for use according to the invention and details about the use and effects of these additives are described in Kunststoff-Handbuch, vol. VII, published by Vieweg and Höchtlen, Carl-Hanser-Verlag, Munich, 1966, e.g. on pages 121 to 205.

When preparing a foam, according to the invention the foaming procedure may also be performed in closed moulds. In this case the reaction mixture is introduced into a mould. Suitable mould materials are metals, e.g. aluminium, or plastics, e.g. epoxide resin. The foamable reaction mixture foams in the mould and forms the moulded item. The mould-foaming procedure may be performed in such a way that the moulded item has a cellular structure at its surface. It may also be performed, however, in such a way that the moulded item has a solid skin and a cellular core. According to the invention, the procedure in the first case is to introduce sufficient foamable reaction mixture into the mould for the foam produced to just fill the mould. The mode of operation in the last-mentioned case comprises introducing more foamable reaction mixture into the mould than is required to fill the interior of the mould with foam. In the latter case, therefore, the process uses "overcharging", a type of procedure which is known, e.g. from U.S. Pat. Nos. 3,178,490 and 3,182,104.

The invention also provides use of the rigid foam prepared according to the invention as an intermediate layer for laminated elements and for filling the hollow spaces in domestic refrigerators with foam.

The process according to the invention is preferably used for filling the hollow cavities in refrigerator and freezer housings with foam.

Obviously, expanded materials may also be produced by block foaming or by the double transport method which is known per se.

The rigid foams obtainable according to the invention are used, for instance, in the building industry and for the insulation of long-distance energy pipes and containers.

The following examples are intended to explain the invention without, however, restricting its scope.

The surface tension was determined by the conditions in appendix V of the Directive described in the Official Journal of the European Community in accordance with Directive 92/69/EWG (17th amendment to Directive 67/548/EWG) with the OECD ring method, taking the GLP into account.

EXAMPLE 1 (COMPARISON EXAMPLE)

Formulation for Polyurethane Rigid Foam

Component A

- 50 parts by wt. sucrose (80 wt. %) and propylene glycol (20 wt. %) started polyether with a molecular weight of 600, obtained by anionic polyaddition using 1,2-propylene oxide (surface tension with respect to n-pentane: 4.4 mN/m)
- 25 parts by wt. trimethylolpropane started polyether with a molecular weight of 430, obtained by anionic polyaddition using 1,2-propylene oxide (surface tension with respect to n-pentane: 1.3 mN/m)
- 25 parts by wt. propylene glycol started polyether with a molecular weight of 1,000, obtained by anionic polyaddition using 1,2-propylene oxide (surface tension with respect to n-pentane: 0.8 mN/m)
- 2.5 parts by wt. water
- 2.0 parts by wt. foam stabiliser, B 8423 (from Goldschmidt)
- 2.0 parts by wt. activator, Desmorapid 726b (Bayer AG)

Component B

- 125 parts by wt. crude MDI (NCO content=31.5 wt. %) (surface tension with respect to n-pentane 3.3 mN/m)

100 parts by wt. of component A were mixed with 11 parts by wt. of n-pentane and 125 parts by wt. of component B using a stirrer (2,000 rpm) at 20° C. and compressed in a closed mould at 34 kg/m$^3$.

EXAMPLE 2 (COMPARISON EXAMPLE)

Formulation for Polyurethane Rigid Foam

Component A

- 100 parts by wt. sorbitol started polyether with a molecular weight of 640, obtained by anionic polyaddition using ethylene oxide (surface tension with respect to n-pentane: 12.4 mN/m)
- 2.5 parts by wt. water
- 2.0 parts by wt. foam stabiliser, B 8423 (from Goldschmidt)
- 2.0 parts by wt. activator, Desmorapid 726b (Bayer AG)

Component B

- 168 parts by wt. crude MDI (NCO content=31.5 wt. %) (surface tension with respect to n-pentane 3.3 mN/m)

100 parts by wt. of component A were mixed with 11 parts by wt. of n-pentane and 168 parts by wt. of component B using a stirrer (2,000 rpm) at 20° C. An expanded material could not be obtained due to the structure collapsing.

EXAMPLE 3 (COMPARISON EXAMPLE)

Formulation for Polyurethane Rigid Foam

Component A

- 50 parts by wt. sucrose (80 wt. %) and propylene glycol (20 wt. %) started polyether with a molecular weight of 600, obtained by anionic polyaddition using 1,2-propylene oxide (surface tension with respect to n-pentane: 4.4 mN/m)
- 25 parts by wt. trimethylolpropane started polyether with a molecular weight of 430, obtained by anionic polyaddition using 1,2-propylene oxide (surface tension with respect to n-pentane: 1.3 mN/m)

25 parts by wt. propylene glycol started polyether with a molecular weight of 1,000, obtained by anionic polyaddition using 1,2-propylene oxide (surface tension with respect to n-pentane: 0.8 mN/m)

2.5 parts by wt. water 2.0 parts by wt. foam stabiliser, B 8423 (from Goldschmidt)

2.0 parts by wt. activator, Desmorapid 726b (Bayer AG)

Component B 146 parts by wt. prepolymer with an NCO content of 27 wt. %, obtained by reacting 92 wt. % of crude MDI (NCO content=31.5 wt. %) with 8 wt. % of polyetherester with a molecular weight of 370 based on phthalic anhydride, diethylene glycol and ethylene oxide.

100 parts by wt. of component A were mixed with 11 parts by wt. of n-pentane and 146 parts by wt. of component B using a stirrer (2,000 rpm) at 20° C. and compressed in a closed mould at 34 kg/m³.

EXAMPLE 4 (ACCORDING TO THE INVENTION)

Formulation for Polyurethane Rigid Foam

Component A 100 parts by wt. sorbitol started polyether with a molecular weight of 640, obtained by anionic polyaddition using ethylene oxide (surface tension with respect to n-pentane: 12.4 mN/m)

2.5 parts by wt. water 2.0 parts by wt. foam stabiliser, B 8423 (from Goldschmidt)

2.0 parts by wt. activator, Desmorapid 726b (Bayer AG)

Component B 196 parts by wt. prepolymer with an NCO content of 27 wt. %, obtained by reacting 92 wt. % of crude MDI (NCO content=31.5 wt. %) with 8 wt. % of polyetherester with a molecular weight of 370 based on phthalic anhydride, diethylene glycol and ethylene oxide (surface tension with respect to n-pentane 5 mN/m)

100 parts by wt. of component A were mixed with 11 parts by wt. of n-pentane and 196 parts by wt. of component B using a stirrer (2,000 rpm) at 20° C. and compressed in a closed mould at 34 kg/m³.

EXAMPLE 5 (ACCORDING TO THE INVENTION)

Component A 80 parts by wt. sorbitol started polyether with a molecular weight of 640, obtained by anionic polyaddition using ethylene oxide (surface tension with respect to n-pentane: 12.4 mN/m)

20 parts by wt. polyether-ester with a molecular weight of 370 based on phthalic anhydride, diethylene glycol and ethylene oxide (surface tension with respect to n-pentane: 12.3 mN/m)

2.5 parts by wt. water 2.0 parts by wt. foam stabiliser, B 8423 (from Goldschmidt)

2.0 parts by wt. activator, Desmorapid 726b (Bayer AG)

Component B 193 parts by wt. prepolymer with an NCO content of 25.5 wt. %, obtained by reacting 90 wt. % of crude MDI (NCO content=31.5 wt. %) with 10 wt. % of polyetherester with a molecular weight of 355 based on phthalic anhydride and diethylene glycol (surface tension with respect to n-pentane 6.4 mN/m)

100 parts by wt. of component A were mixed with 11 parts by wt. of n-pentane and 193 parts by wt. of component B using a stirrer (2,000 rpm) at 20° C. and compressed in a closed mould at 34 kg/m³.

The test figures in the following Table were obtained for the foam sheets prepared in examples 1 to 5.

| Example | Thermal conductivity [mW/mK] according to DIN 52616, 24° C. |
|---|---|
| 1 | 24 |
| 2 | collapsed |
| 3 | 23.3 |
| 4 | 20.5 |
| 5 | 20.0 |

As can be seen from examples 4 and 5, n-pentane blown PUR rigid foams with much lower thermal conductivities can be obtained by combining polyethers and polyisocyanates according to the invention.

We claim:

1. A process for preparing polyurethane rigid foams from polyols and polyisocyanates as well as blowing agents and optionally foam auxiliary agents, characterised in that the polyurethane rigid foam is obtained by reacting A) a polyol component with on average at least 3 hydrogen atoms, containing
  1. 60 to 100% of polyethers and/or polyesters with at least 2 hydroxyl groups and a molecular weight of 250 to 1,500, which have a surface tension of 6 to 14 mN/m with respect to i-pentane and/or n-pentane as blowing agent, wherein the polyethers are obtained by the polyaddition of 70 to 100 wt. % of ethylene oxide and 0 to 30 wt. % of propylene oxide to starter compounds
  2. i-pentane and/or n-pentane as blowing agent,
  3. water and
  4. optionally auxiliary agents and additives with B) a polyisocyanate with an NCO-content of 20 to 48 wt. % which has a surface tension of 4.0 to 8 mN/m with respect to i-pentane or n-pentane as blowing agent.

2. A process for preparing polyurethane rigid foams according to claim 1, characterised in that a sorbitol started polyether with a molecular weight of 500 to 1,400 based on 70 to 100 wt. % of ethylene oxide and 0 to 30 wt. % of 1,2-propylene oxide is used.

3. A process for preparing polyurethane rigid foams according to claim 1, characterised in that a sucrose started polyether with a molecular weight of 500 to 1,400 based on 70 to 100 wt. % of ethylene oxide and 0 to 30 wt. % of 1,2-propylene oxide is used.

4. A process for preparing polyurethane rigid foams according to claim 1, characterised in that a trimethylolpropane started polyether with a molecular weight of 250 to 850 based on 70 to 100 wt. % of ethylene oxide and 0 to 30 wt. % of 1,2-propylene oxide is used.

5. A process for preparing polyurethane rigid foams according to claim 1, characterised in that a glycerine started polyether with a molecular weight of 250 to 850 based on 70 to 100 wt. % of ethylene oxide and 0 to 30 wt. % of 1,2-propylene oxide is used.

6. A process for preparing polyurethane rigid foams according to claim 1, characterised in that an o-toluylene diamine started polyether with a molecular weight of 250 to 850 based on 70 to 100 wt. % of ethylene oxide and 0 to 30 wt. % of 1,2-propylene oxide is used.

7. A process for preparing polyurethane rigid foams according to claim 1, characterised in that a polyester with a molecular weight of 200 to 600, formed from aromatic and aliphatic dicarboxylic acids and polyols with at least 2 hydroxyl groups, is used.

8. A process for preparing polyurethane rigid foams according to claim 1, characterised in that a prepolymer with an NCO content of 20 to 33 wt. % and with terminal NCO groups, which has been obtained by reacting
   1. 4,4'-diphenylmethane diisocyanate, optionally in a mixture with the 2,4 and 2,2-isomers and 0 to 30 wt. % of higher functional fractions, with
   2. a polyether with a molecular weight of 60 to 1,400 obtained by the polyaddition of 70 to 100 wt. % of ethylene oxide and 0 to 30 wt. % of 1,2-propylene oxide, is used as the polyisocyanate.

9. A process for preparing polyurethane rigid foams according to claim 1, characterised in that a prepolymer with an NCO content of 20 to 33 wt. % and with terminal NCO groups, which has been obtained by reacting
   1. 4,4'-diphenylmethane diisocyanate, optionally in a mixture with the 2,4 and 2,2-isomers and 0 to 30 wt. % of higher functional fractions, with
   2. a polyester with a molecular weight of 200 to 600 based on aromatic and aliphatic dicarboxylic acids and polyols with at least 2 hydroxyl groups, is used as the polyisocyanate 10. . A process for preparing polyurethane rigid foams according to claim 1, characterised in that a prepolymer with an NCO content of 25 to 45 wt. % and with terminal NCO groups which has been obtained by reacting
    1. toluylene diisocyanate, optionally a mixture of the 2,4 and 2,6-isomers and 0 to 30 wt. % of higher functional fractions, with
    2. a polyether with a molecular weight of 60 to 1,400 obtained by the polyaddition of 70 to 100 wt. % of ethylene oxide and 0 to 30 wt. % of 1,2-propylene oxide to starter compounds, is used as the polyisocyanate.

11. A process for preparing polyurethane rigid foams according to claim 1, characterised in that a prepolymer with an NCO content of 25 to 45 wt. % and with terminal NCO groups, which has been obtained by reacting
    1. toluylene diisocyanate, optionally a mixture of the 2,4 and 2,6-isomers and 0 to 30 wt. % of higher functional fractions, with
    2. a polyester with a molecular weight of 200 to 600 based on aromatic and aliphatic dicarboxylic acids and polyols with at least 2 hydroxyl groups, is used as the polyisocyanate.

* * * * *